7561X
W. Loomis,
Motor.
Patented Apr. 29, 1833.
Fig:
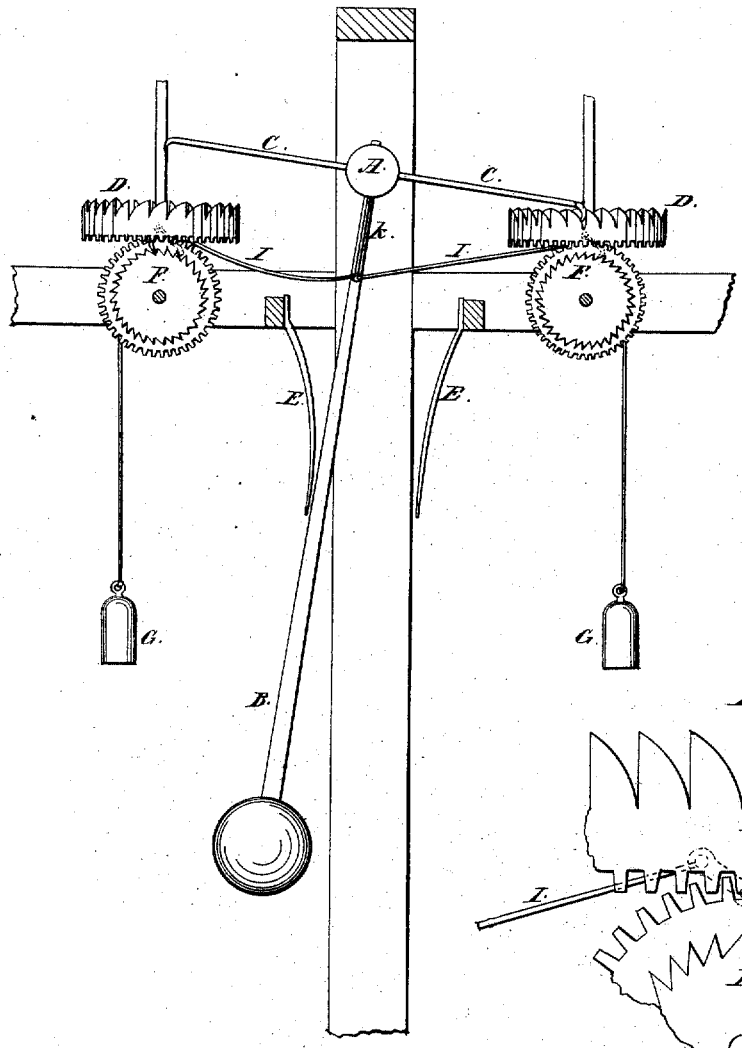
Fig:
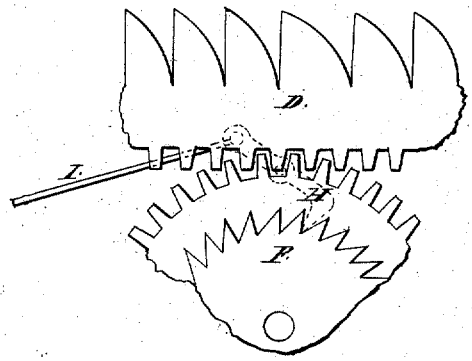
AM. PHOTO-LITHO. CO. N.Y. (OSBORNE'S PROCESS)

William Loomis

The Schedule referred to in these Letters Patent and making part of the same containing a description in the words of the said William Loomis himself of his improvement being a helping power machine

---

This machine which is designed to operate any kind of mechanical machinery consists of a frame the size and proportion of which must be varied according to the machinery to be operated. At the centre of the top of the frame is an arbor to which is attached a pendulum rod at or near the end of which is the pendulum weight. in the arbor, and perpendicular to the pendulum rod are two arms extending in opposite directions, each one operating in a crown or centre wheel, properly fitted with teeth, and by the alternate action of these wheels the pendulum is kept in motion. Near the other end of the arbor, arms are also fixed to which the machinery to be operated is attached. When the pendulum is swung to either extreme its motion is accelerated back by means of springs operating on the pendulum rods.

The motion to each of the wheels is conducted by means of one or more other wheels and pinions from a weight attached to a ratch wheel or the machine may be kept in motion by any other sufficient power. To each of these crown or centre wheels is a dog to catch in the teeth of the wheel and suspend its motion while the other wheel is in operation. The dog is disengaged from the teeth of the wheel when the pendulum is swung to its extreme opposite direction by a chain or rod to which it is attached, the other end of the chain or rod being fixed to a pin or bolt extending downwards from the centre of the wheel thus [illegible] [illegible] commences its motion

[illegible]

[illegible] operating on the arm gives fresh [illegible] accelerated

[illegible] to the pendulum, and when the tooth of the wheel leaves the arm, having passed beyond its reach, the motion of the wheel is again held in check by the dog.

Thus by the alternate action of the wheels is the motion communicated to the pendulum & continues until the weight is run down.

Witnesses

H. B. William P. Elliot

[illegible] 1837 Charles Bulfinch jr

William Loomis (Dr in portfolio)

([illegible])